United States Patent
Fernstrom et al.

(10) Patent No.: US 11,894,199 B2
(45) Date of Patent: Feb. 6, 2024

(54) METHOD OF AGING AN ALUMINUM ELECTROLYTIC CAPACITOR

(71) Applicant: Pacesetter, Inc., Sunnyvale, CA (US)

(72) Inventors: Pete J. Fernstrom, Pickens County, SC (US); Jason Hemphill, Sunset, SC (US); Timothy Marshall, Pickens, SC (US); Tommy T. Davis, Simpsonville, SC (US); Joseph Beauvais, Liberty, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 256 days.

(21) Appl. No.: 17/344,334

(22) Filed: Jun. 10, 2021

(65) Prior Publication Data

US 2021/0391120 A1  Dec. 16, 2021

Related U.S. Application Data

(60) Provisional application No. 63/037,925, filed on Jun. 11, 2020.

(51) Int. Cl.
| | |
|---|---|
| *H01G 9/00* | (2006.01) |
| *H01G 9/145* | (2006.01) |
| *H01G 9/035* | (2006.01) |
| *H01G 13/04* | (2006.01) |

(52) U.S. Cl.
CPC ........... *H01G 9/0029* (2013.01); *H01G 9/035* (2013.01); *H01G 9/145* (2013.01); *H01G 13/04* (2013.01)

(58) Field of Classification Search
None
See application file for complete search history.

(56) References Cited

U.S. PATENT DOCUMENTS

| | | | |
|---|---|---|---|
| 5,131,388 A | 7/1992 | Pless et al. | |
| 5,922,215 A * | 7/1999 | Pless | H01G 9/0029 216/33 |
| 6,605,127 B2 * | 8/2003 | Narusawa | H01G 9/0029 29/25.03 |
| 7,006,347 B1 * | 2/2006 | Kroll | H01G 2/12 361/508 |
| 7,695,529 B1 | 4/2010 | Marshall et al. | |
| 10,755,863 B2 * | 8/2020 | Aoyama | H01G 9/055 |
| 2003/0008531 A1 * | 1/2003 | Narusawa | H01G 9/0029 361/535 |

(Continued)

FOREIGN PATENT DOCUMENTS

| | | | | |
|---|---|---|---|---|
| DE | 60128362 T2 * | 1/2008 | ........... | A61N 1/3956 |
| EP | 1278217 A1 * | 1/2003 | ........... | H01G 9/0029 |
| WO | WO-2016123826 A1 * | 8/2016 | ............. | H01G 9/025 |

*Primary Examiner* — Scott B Geyer
(74) *Attorney, Agent, or Firm* — Lerner David LLP (57) ABSTRACT

A method of manufacturing an aluminum electrolytic capacitor includes impregnating an aluminum electrolytic capacitor with a first electrolyte to form a first impregnated capacitor, aging the first impregnated capacitor using a first aging process to form a first aged capacitor, impregnating the first aged capacitor with a second electrolyte to form a second impregnated capacitor, the second electrolyte being different from the first electrolyte, aging the second impregnated capacitor using a final aging process to form a final aged capacitor, and impregnating the final aged capacitor with a third electrolyte.

20 Claims, 4 Drawing Sheets

(56) References Cited

U.S. PATENT DOCUMENTS

| | | | |
|---|---|---|---|
| 2006/0092598 A1* | 5/2006 | Yoshihara | H01G 9/055 361/508 |
| 2015/0211145 A1* | 7/2015 | Hemphill | C25F 3/14 205/667 |
| 2017/0200560 A1* | 7/2017 | Bowen | H01G 9/0032 |
| 2018/0025846 A1* | 1/2018 | Liu | H01G 9/15 29/25.03 |
| 2018/0358180 A1* | 12/2018 | Hemphill | H01G 9/055 |
| 2020/0111621 A1* | 4/2020 | Xiong | H01G 9/0029 |
| 2021/0005395 A1* | 1/2021 | King | H01G 9/0029 |

\* cited by examiner

```
┌─────────────────────────────────────────────────────────────┐
│  IMPREGNATING AN ELECTROLYTIC CAPACITOR WITH A FIRST        │
│                    ELECTROLYTE  202                         │
└─────────────────────────────────────────────────────────────┘
                              │
┌─────────────────────────────────────────────────────────────┐
│   AGING THE ELECTROLYTIC CAPACITOR IN A FIRST AGING PROCESS │
│                            204                              │
└─────────────────────────────────────────────────────────────┘
                              │
┌─────────────────────────────────────────────────────────────┐
│   IMPREGNATING AN ELECTROLYTIC CAPACITOR WITH A SECOND      │
│                    ELECTROLYTE  206                         │
└─────────────────────────────────────────────────────────────┘
                              │
┌─────────────────────────────────────────────────────────────┐
│   AGING THE ELECTROLYTIC CAPACITOR IN A FINAL AGING PROCESS │
│                            208                              │
└─────────────────────────────────────────────────────────────┘
                              │
┌─────────────────────────────────────────────────────────────┐
│    IMPREGNATING AN ELECTROLYTIC CAPACITOR WITH A THIRD      │
│                    ELECTROLYTE  210                         │
└─────────────────────────────────────────────────────────────┘
```

METHOD OF AGING AN ALUMINUM ELECTROLYTIC CAPACITOR

CROSS REFERENCE TO RELATED APPLICATIONS

The present application claims priority from U.S. Provisional Patent Application No. 63/037,925, filed on Jun. 11, 2020, the disclosure of which is incorporated by reference herein.

FIELD OF THE INVENTION

The present disclosure relates generally to the field of electrolytic capacitors and batteries.

BACKGROUND

Compact, high voltage capacitors are utilized as energy storage reservoirs in many applications, including implantable medical devices. These capacitors are required to have a high energy density, since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, the disclosure of which is hereby incorporated herein by reference, typically use two electrolytic capacitors in series to achieve the desired high voltage for shock delivery. For example, an ICD may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors include a laminate of an etched aluminum foil anode, an aluminum foil or film cathode, and a kraft paper or fabric gauze separator impregnated with a solvent-based liquid electrolyte interposed between the anode and the cathode. While aluminum is the preferred metal for the anode plates, other metals such as tantalum, magnesium, titanium, niobium, zirconium and zinc may be used. A typical solvent-based liquid electrolyte may be a mixture of a weak acid and a salt of a weak acid, preferably a salt of the weak acid employed in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and encased, with the aid of suitable insulation, in an aluminum tube or canister. Connections to the anode and the cathode are made via tabs. Alternative flat constructions for aluminum electrolytic capacitors are also known, comprising a planar, layered stack structure of electrode materials with separators interposed therebetween, such as those disclosed in the above-mentioned U.S. Pat. No. 5,131,388.

In ICDs, as in other applications where space is a critical design element, it is desirable to use capacitors with the greatest possible capacitance per unit volume. Since the capacitance of an aluminum electrolytic capacitor is provided by the anodes, a clear strategy for increasing the energy density in the capacitor is to minimize the volume taken up by the separators and cathodes and maximize the number of anodes. A multiple anode stack configuration requires fewer cathodes and paper separators than a single anode configuration and thus reduces the size of the device. A multiple anode stack has a number of units each consisting of, in series, a cathode, a paper separator, two or more anodes, a paper separator and a cathode, with neighboring units sharing the cathode between them, all placed within the capacitor case.

Historically, aluminum electrolytic capacitors need more frequent capacitor maintenance charge cycles as the capacitors are not charged while stored at room temperature in an ICD before implantation in a patient, or while housed in an ICD in the patient's body. Without charging the capacitors during nonuse, the charge time will increase over time because of deformation, which results from the susceptibility of aluminum oxide to dielectric relaxation/absorption, dielectric impurities/flaws/stress relaxation, and chemical attack by the electrolyte. Typical capacitor maintenance schedules are 3 months to 6 months for aluminum electrolytic capacitors. Due to the frequency of these maintenance schedules, an aluminum electrolytic capacitor requires significantly more battery life resulting in a shortened ICD longevity.

After the anodic foil is etched and formed into a pseudo boehmite oxide, anodes are mechanically punched out or laser cut to reveal a fresh aluminum edge without oxide. Therefore, an aging process is needed to grow oxide on the non-formed edges. Typically, the aging process is a 24-hour protocol in which the capacitor is impregnated with electrolyte both before the aging process and after the aging process. An exemplary aging process of this type is described in U.S. Pat. No. 7,695,529, the disclosure of which is incorporated herein by reference in its entirety. The re-impregnation with electrolyte after the aging process is due to electrolyte being forced from the capacitor as a result of hydrogen evolvement during the aging process. In a typical commercial capacitor, excess electrolyte can be included at the expense of a larger capacitor volume. This is not possible with medical capacitors which are designed to have a minimal size. As electrolyte is lost during this typical aging process, the process of building the oxide layer in the anodic foil becomes less efficient as the resistance of the capacitor increases. Without re-impregnation after the aging process, there is insufficient electrolyte present in the capacitor after the aging process has been completed.

In view of the foregoing, there is a need in the art for an improved and more efficient aging process that lengthens the maintenance schedule of aluminum electrolytic capacitors and therefore increases the battery life in an ICD.

BRIEF SUMMARY

Methods of aging an aluminum electrolyte capacitor are disclosed herein. One aspect of the present disclosure relates to a method of manufacturing an aluminum electrolytic capacitor is disclosed herein. In some embodiments, the method comprises impregnating an aluminum electrolytic capacitor with a first electrolyte to form a first impregnated capacitor, aging the first impregnated capacitor using a first aging process to form a first aged capacitor, impregnating the first aged capacitor with a second electrolyte to form a second impregnated capacitor, the second electrolyte being different from the first electrolyte, aging the second impregnated capacitor using a final aging process to form a final aged capacitor, and impregnating the final aged capacitor with a third electrolyte.

DETAILED DESCRIPTION

The following detailed description of methods of aging an aluminum electrolytic capacitor refers to the accompanying drawings that illustrate exemplary embodiments consistent with these devices. Other embodiments are possible, and modifications may be made to the embodiments within the spirit and scope of the methods and systems presented herein. It will be apparent to a person skilled in the relevant art that the methods and systems can also be employed for use in a variety of devices and applications in addition to their use in implantable cardioverter defibrillators (ICD). Therefore, the following detailed description is not meant to limit the devices described herein. Rather, the scope of these methods and devices is defined by the appended claims.

Figure 1:
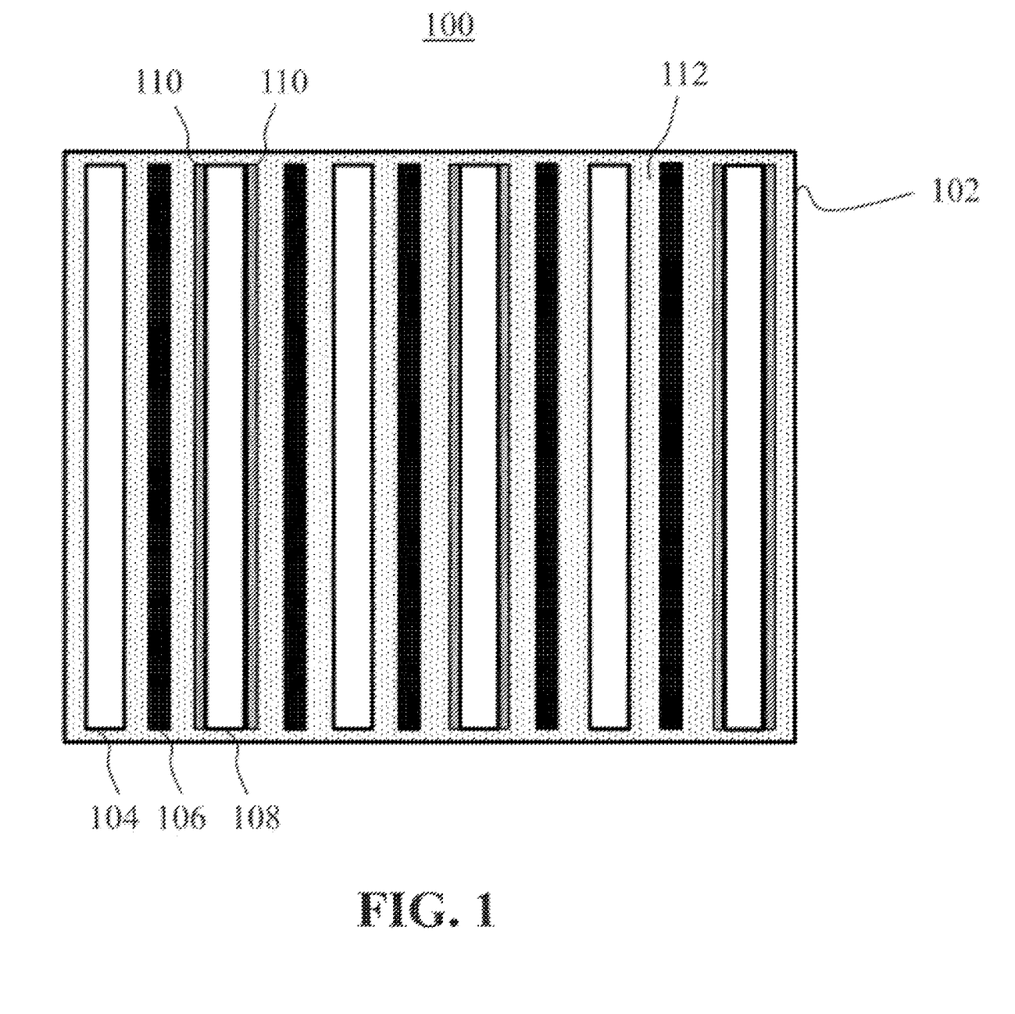
FIG. 1 is a cross-sectional view of an electrolytic capacitor in accordance with an embodiment of the present disclosure.

FIG. 1 is a cross-sectional view of an electrolytic capacitor 100. Electrolytic capacitor 100 includes a housing 102 that contains a plurality of cathodes 104 alternating with a plurality of anodes 108, with each cathode being separated from an adjacent anode by a separator 106. Each anode 108 includes a dielectric material 110, e.g., an oxide layer, on or around its outer surface. Dielectric material 110 may be an oxide that is thermally grown on, or deposited onto, the surface of anode 108. A high-k dielectric material may be used for dielectric material 110. A conductive electrolyte 112 fills the space between each of the elements within housing 102. Electrolyte 112 may be a polymer or liquid electrolyte as would be understood by one skilled in the art. Example electrolytes include ethylene glycol/boric acid-based electrolytes and anhydrous electrolytes based on organic solvents such as dimethylformamide (DMF), dimethylacetamide (DMA), or gamma-butyrolactone (GBL). The plurality of cathodes 104 may be electrically connected to a single, common cathode terminal, and the plurality of anodes 108 may be similarly connected to a single, common anode terminal.

Exemplary materials for the plurality of cathodes 104 include aluminum, titanium and stainless steel, while exemplary materials for the plurality of anodes 108 include aluminum and tantalum.

Separators 106 may be provided to maintain a given separation between each cathode 104 and an adjacent anode 108 within housing 102. Additionally, separators 106 may be provided to prevent arcing between cathode 104 and anode 108 in spaces where dielectric 110 may be very thin or nonexistent, and/or where a void within electrolyte 112 exists between cathode 104 and anode 108.

The dielectric layer 110, e.g., an oxide layer, provides a high resistance to current passing between the electrolyte and the anode 108 in the capacitor. This current is referred to as the leakage current. A high leakage current can result in poor performance and reliability of an electrolytic capacitor. In particular, high leakage current results in a greater amount of charge leaking out of the capacitor once it has been charged.

In an embodiment, the dielectric layer 110 includes aluminum oxide, where the aluminum oxide includes a pseudo-boehmite phase and a boehmite phase. The presence of a large boehmite phase can result in less deformation of the capacitor and a reduced maintenance cycle.

The amount of the boehmite phase in the aluminum oxide layer may be about 50 weight percent (wt %) or greater. In one embodiment, the amount of boehmite phase may range from about 50 wt % to about 51 wt % of the aluminum oxide. The amount of the pseudo-boehmite phase may be about 50 wt % or less of the aluminum oxide. In one embodiment, the amount of pseudo-boehmite phase may range from about 49 wt % to about 50 wt %. The boehmite phase is less porous than the pseudo-boehmite phase, and may provide increased protection against the aqueous solvent of the electrolyte which can cause deformation of the capacitor. The pseudo-boehmite phase may be characterized by a higher water content than the boehmite phase. The structure of an aluminum oxide layer having a pseudo-boehmite phase may be a core-shell structure in which the boehmite phase is present at the surface of the layer and the pseudo-boehmite phase is deeper within the aluminum oxide layer.

It should be understood that the various elements and dimensions of electrolytic capacitor 100 are not drawn to scale. Although cathodes 104, separators 106, and anodes 108 are illustrated as being spaced apart from one another for the convenience of illustration and labeling, it will be understood by one skilled in the art that such elements may be stacked together in close physical contact with one another.

Figure 2:
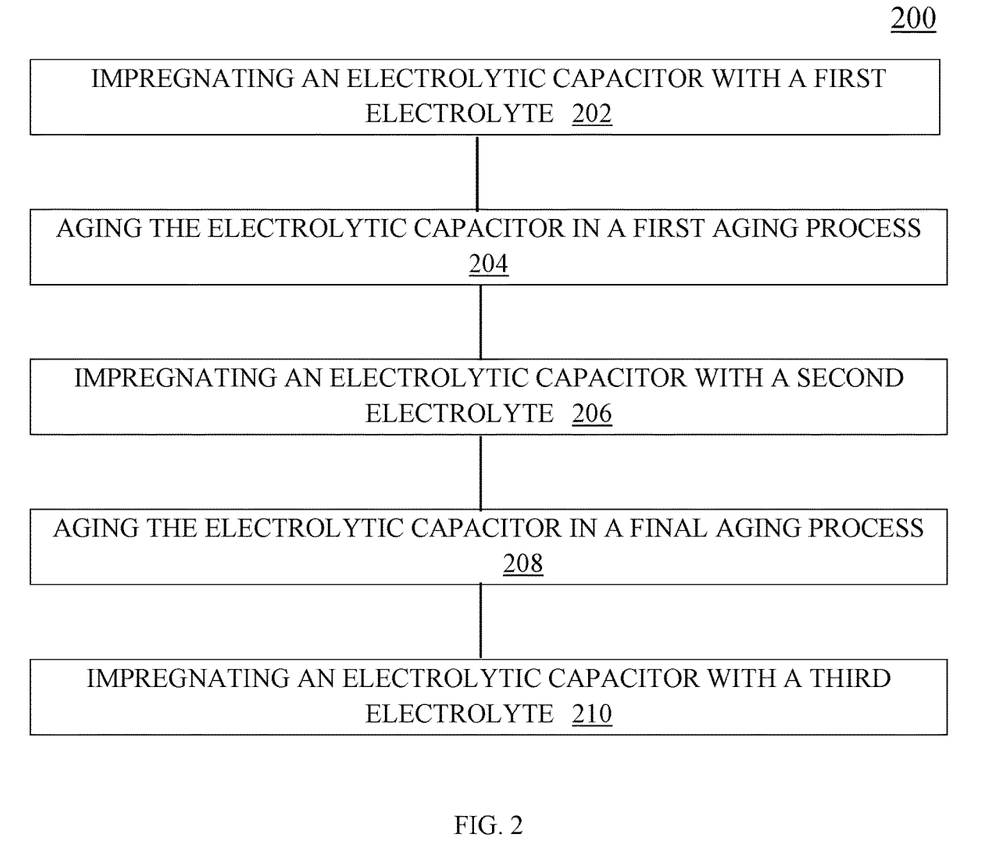
FIG. 2 depicts a method of aging an electrolytic capacitor in accordance with an embodiment of the present disclosure.

FIG. 2 provides an exemplary method 200 of aging an electrolytic capacitor. Method 200 begins with, for example, the electrolytic capacitor 100, prior to impregnation with an electrolyte solution. Method 200 is a two-step aging process that may have advantages over a conventional one-step aging process. The two-step aging process may advantageously enable capacitor maintenance to be avoided for up to 5 years in storage at a maximum storage temperature of about 28° C. and may increase capacitor maintenance cycles to about 9 months in the body at about 37° C. The two-step aging process may also enable capacitor maintenance to be avoided for up to 2 years after initial implantation. Due to the lengthening of the maintenance cycle, battery life of the ICD containing the electrolytic capacitor may be extended by 1 year or more.

At step 202, the electrolytic capacitor is impregnated with a first electrolyte. The first electrolyte may include one or more of an electrolyte solvent, electrolytic salt, and/or a phosphate compound. Suitable electrolyte solvents include ethylene glycol, water, γ-butylactone, 2-methoxy ethanol, propylene glycol, and polyethylene glycol. The electrolytic salt may include ammonium borate, ammonium boric acid, ammonium $C_5$-$C_{10}$ carboxylic acid, and/or an amine analogue instead of ammonia. The electrolytic salt may be present in an amount of about 10 wt % or less, based on the total weight of the first electrolyte. The first electrolyte optionally may also include a phosphate compound, such as phosphoric acid, and/or diammonium phosphate. The phosphate compound may be present in an amount ranging from 0 parts per million (ppm) to 1000 ppm, based on the total weight of the first electrolyte. Water may be present in an amount ranging from about 10 wt % or less, about 3 wt % or less, about 1 wt % or less, less than about 1 wt %, less than about 3 wt %, about 2.5 wt % to about 10 wt %, or about 1 wt % to about 2 wt %, based on the total weight of the first electrolyte. An exemplary first electrolyte may have a conductivity at about 30 to 37° C. ranging from about 0.5 millisemens per centimeter (mS/cm) to about 3.5 mS/cm, more preferably about 0.5 mS/cm to about 3.1 mS/cm. The conductivity can be adjusted, for example, by changing the pH, concentration of the electrolytic salt, and/or water content of the electrolyte.

The first electrolyte may be tailored based on the state of the electrolytic capacitor and the mechanisms desired during the first aging process. For example, the anodes of the capacitor, after growth of the dielectric layer thereon, may be mechanically removed from an aluminum sheet, e.g., punched out or laser cut, to reveal an exposed edge without an oxide layer. These anodes may then be assembled into the electrolytic capacitor still having the exposed edge without an oxide layer. The exposed edge may contain aluminum oxide in the form of corundum. It is desired to remove the corundum and replace it with the pseudo-boehmite oxide. However, the presence of a phosphate compound, which improves deformation of the capacitor, can slow the removal of the corundum. In some embodiments, the first electrolyte may include a higher content of water to remove the corundum and grow an oxide on the exposed edge, and a lower content of the phosphate compound which can slow this process. In such embodiments, the water content of the first electrolyte may be up to about 10 wt %, preferably about 2 wt % to about 5 wt %, more preferably less than about 3 wt %, most preferably less than about 1 wt %, based on the total weight of the first electrolyte, and the weight of the phosphate compound may range from about 5 to 500 ppm, based on the total weight of the first electrolyte.

At step 204, the electrolytic capacitor, impregnated with the first electrolyte, is aged in a first aging process. The first aging process may remove the corundum from the exposed edge surfaces of the anodes of the electrolytic capacitor and grow a pseudo-boehmite phase oxide layer in its place. As the first aging process evolves, the first electrolyte may be forced out of the electrolytic capacitor due to the evolution of hydrogen gas from the conversion of water into the oxide layer. Depletion of the first electrolyte causes a less efficient aging process due to the loss of source material, e.g., water, for the growth of the oxide layer. Further, evolution of hydrogen gas may damage the oxide layer being formed on the exposed edge, which may result in incomplete coverage of the edge of the anode. As discussed below, a final aging process is performed to address these deficiencies.

During the first aging process, a device, such as a power supply that can be set to maintain a constant current and/or a constant voltage, may be used to raise an applied voltage until the current between the anode and the cathode of the electrolytic capacitor reaches a target current. The target current may range from about 0.1 to 3 mA. As the oxide layer grows, the resistance within the circuit increases. Accordingly, to maintain the target current, the applied voltage is adjusted until a first target voltage is reached. The first target voltage may be between about 400 V and about 445 V. Once the first target voltage is reached, the voltage is maintained and the current is allowed to drop as the oxide layer continues to grow and the resistance continues to increase. The current may be monitored as a function of time. A time interval for the first aging process may be determined by the behavior of the current as a function of time. For example, when the rate of change of the current with respect to time (e.g., a second derivative) reaches a desired level, the first aging process may be ceased. In some embodiments, the capacitors may be aged in a batch process, i.e., multiple capacitors aged simultaneously. Each capacitor can be monitored individually in terms of current behavior.

The temperature of the electrolytic capacitor may be greater than room temperature during the first aging process, where room temperature is about 15° C. to about 25 C. In some embodiments, the temperature during the first aging process may range from about 35° C. to about 90° C., or about 75° C. to about 90° C. The temperature range may be varied, for example, to decrease the viscosity and/or increase the conductivity of the first electrolyte.

In some embodiments, the first aging process at step 204 may continue for up to about 10 hours before the desired current behavior is achieved. In some embodiments, the first aging process may include several individual steps, where the duration of the steps may total up to about 10 hours. In some embodiments, the duration may total from about 1 hour to about 6 hours, or about 1 hour to about 10 hours. These individual steps may include one or more steps such as those described above at step 204, e.g., an aging step. For example, the process may include multiple aging steps, such as a first step of maintaining a first target current until a first target voltage is reached and then maintaining the first target voltage for a first period of time or until a desired current behavior is achieved, followed by a second step of maintaining a second target current until a second target voltage is reached and then maintaining the second target voltage for a second period of time or until a desired current behavior is achieved.

In some embodiments, an individual step of the first aging process may include a discharge step in which the electrolytic capacitor is discharged to about 0 Volts, and then heated to a temperature above the aging step or maintained at the same temperature of the aging step, but no voltage is applied and no current is generated. The temperature range of the discharge step may be about 25° C. to about 90° C. In some embodiments, the temperature of the discharge step may range from about 55° C. to about 70° C., or about 75° C. to about 90° C. In some embodiments, the duration of the discharge step may be less than that of an individual step in which a voltage is applied. In some embodiments, the duration of the discharge step may be about 5 minutes or less, or less than about 1 minute, or about 10 to about 30 seconds. A discharge step may be used to improve the impregnation of the electrolyte into the electrolytic capacitor. For example, after an individual step in which a voltage is applied, the electrolyte may be depleted locally in the electrolytic capacitor. The discharge step may be utilized to improve the impregnation into the electrolytic capacitor and the conductivity of the capacitor for a successive step in which a voltage is applied to grow an oxide layer on the exposed edges of the anodes. The discharge step may further be utilized to control aspects of the aging process. For example, if the capacitor is aged too fast, resistive heating may occur. If the capacitor is aged too slowly, the aging process may take longer. For example, after a discharge step, the average current may be greater to begin another aging step. At step 206, and after the first aging process, the electrolytic capacitor may be impregnated with a second electrolyte. The second electrolyte may include one or more of an electrolyte solvent, an electrolytic salt, and/or a phosphate compound. These components may be any of the components listed above for the first electrolyte. The electrolytic salt may be present in an amount ranging from about 5 to about 12 wt %, or about 5 to 10 wt %, based on the total weight of the second electrolyte. The phosphate compound may be present in an amount ranging from about 5 to 550 ppm based on the total weight of the second electrolyte. Water may be present in an amount ranging from up to about 3 wt %, less than about 3 wt %, less than about 1 wt %, about 1.5 wt % to about 3 wt %, or about 1 wt % to about 2 wt %, based on the total weight of the second electrolyte. An exemplary second electrolyte may have a conductivity at a temperature of about 30° C. to about 37° C. ranging from about 0.5 mS/cm to about 3.5 mS/cm, about 0.5 mS/cm to about 3.1 mS/cm, or about 2.4 mS/cm to about 3.0 mS/cm. The conductivity can be adjusted, for example, by changing the phosphate content, the concentration of the electrolytic salt, and/or the water content. In some embodiments, the second electrolyte has the same composition as the first electrolyte.

In some embodiments, the second electrolyte may be different in composition from the first electrolyte as the mechanisms desired during the final aging process may be different from those desired in the first aging process. For example, the first aging process may use a first electrolyte having a higher water content, the water being a source material for growth of the oxide layer on the exposed edges of the anodes. The second aging process may use a second electrolyte with a lower water content than that of the first electrolyte. For example, because the oxide layer is already grown during the first aging process, a higher water content in the second electrolyte may not be needed.

At step 208, the final aging process is performed. The final aging process is similar in operation to the first aging process at step 204. During the final aging process, the electrolytic capacitor may be heated to a temperature ranging from about 27° C. to about 90° C., or about 75° C. to about 90° C. The target voltage of the final aging process may range from about 380 V to about 440 V; the target current may range from about 100 microamps (μA) to about 1.2 milliamp (mA); and the duration of the final aging process may be up to about 10 hours. The target current may vary during the aging process. For example, initially the current may be as high as about 1.2 milliamp, and during the aging process may decrease to an exit value of up to about 300 μA, or from about 100 μA to about 200 μA.

The final aging process may include one or more individual steps. In some embodiments, the individual steps may have a total duration of up to about 10 hours. The individual steps may include an aging step in which a voltage is applied to the capacitor and a discharge step in which a voltage is discharged from the capacitor. In some embodiments, an individual step may use a target voltage that is lower than the target voltage used in the first aging process. In other embodiments, an individual step may use a target voltage that is greater than the target voltage used in the first aging process. In still other embodiments, one step may use a target voltage that is lower than that used in the first aging process, and another step may use a target voltage that is greater than that used in the first aging process. In some embodiments, an aging step in which a voltage is applied to the capacitor may be alternated with a discharge step in which to the voltage is discharged from the capacitor. The duration of each individual step may be up to about 1 hour, or about 15 min to about 1 hr, or about 30 min to about 1 hr, or about 15 min to about 30 min, or about 15 min or less, or about 5 min or less. The individual steps may be provided, instead of a single step, for the purpose of delivering more coulombs in the same amount of time.

In some embodiments, an exemplary individual step in which a voltage is applied in the final aging process may include applying the voltage using a device, such as a power supply that can be set to maintain a constant current and/or a constant voltage, until the current between the anode and the cathode of the electrolytic capacitor reaches a target current. The target current may range from about 100 microamps (μA) to about 1.2 milliamp (mA). As the oxide layer grows and/or is reformed/repaired during the final aging process, the resistance within the circuit increases. Accordingly, to maintain the target current, the applied voltage is adjusted until a first target voltage is reached. The first target voltage may be between about 380 V to about 445 V. Once the first target voltage is reached, the voltage is maintained and the current is allowed to drop as the oxide layer continues to grow and the resistance continues to increase. The current may be monitored in a similar manner to the first aging process. When a desired behavior of the current is obtained, the individual aging step may be terminated. The target current may vary during the aging process. For example, initially the current may be as high as about 1.2 milliamp, and during the aging process may decrease to an exit value of up to about 300 μA, or from about 100 μA to about 200 μA.

The temperature of the electrolytic capacitor during an individual step of the final aging process or during the entire final aging process may be greater than room temperature. In some embodiments, the temperature during an individual step in which a voltage is applied during the final aging process may range from about 75° C. to about 90° C.

In some embodiments, an exemplary discharge step during the final aging process may include discharging the capacitor from a prior aging step to about 0 volts, and heating the electrolytic capacitor to a temperature above that of the prior aging step or maintaining the temperature at that of the prior aging step. In some embodiments, the temperature of the discharge step may range from about 25° C. to about 90° C., or 25° C. to about 45° C., or about 75° C. to about 90° C. In some embodiments, a duration of the discharge step may be less than that of an aging step. In some embodiments, the duration of the discharge step may range up to about 5 minutes, or up to about 1 minute, or up to about 30 seconds, or about 30 seconds to about 1 minute.

At step 210, and after the final aging process, the electrolytic capacitor may be impregnated with a third electrolyte. The third electrolyte may include one or more of an electrolyte solvent, an electrolytic salt, and/or a phosphate compound. These components may be any of the components listed above for the first electrolyte. The electrolytic salt may be present in an amount ranging from about 10 to 12 wt %, or about 11 to about 12 wt %, or about 10 wt % or less, based on the total weight of the third electrolyte. The phosphate compound may be present in an amount ranging from 5 to 550 ppm, based on the total weight of the third electrolyte. Water may be present in an amount ranging from less than about 1 wt % to about 2 wt %, or about 1.5 wt % to about 2 wt %, or less than about 3 wt %, or less than about 1 wt %, based on the total weight of the third electrolyte. It is noted that this third electrolyte may contain a lower water content than that used in the first and second electrolytes to help slow water attack by the electrolyte during times of nonuse either in storage prior to implantation or in the body. An exemplary third electrolyte may have a conductivity at about 30° C. to about 37° C. ranging from about 2.4 mS/cm to about 3.4 mS/cm. The conductivity can be adjusted, for example, by changing the phosphate content, the concentration of the electrolytic salt, and/or the water content.

The third electrolyte is the final electrolyte provided to the electrolytic capacitor. After impregnation with the third electrolyte, the electrolytic capacitor is used as part of an ICD. The ICD is either shelved until required for use in the body of a patient or implanted into the patient. As shown in the examples provided herein, the aging methods of the present disclosure can reduce the need for capacitor maintenance inside and outside the body compared to conventional aging processes.

Example 1

In Example 1, an electrolytic capacitor was aged according to the methods of the present disclosure.

The electrolytic capacitor was impregnated with a first electrolyte. The first electrolyte included 90.7 wt % ethylene glycol, 6.0 wt % azelaic acid, 1.0 wt % boric acid, 0.36 wt % ammonium hydroxide, 0.70 wt % anhydrous ammonia, and 183 ppm phosphate. The first electrolyte has the following properties: 7.23 pH, 2.7 mS/cm at 30° C., and 2.24 wt % moisture. The electrolytic capacitor was aged using the first aging process summarized in Table 1 below.

TABLE 1

| Step | Current (mA) | Voltage (V) | Voltage Tolerance (V) | Temperature (° C.) | Temperature Tolerance (° C.) | Time (Hr:Min) |
|---|---|---|---|---|---|---|
| 1 | 1.2 | 410 | 400-420 | 37 | 27-42 | 3:05 |
| 2 | 1.2 | 435 | 425-445 | 37 | 27-42 | 5:00 |
| 3 | 0 | 0 | — | 65 | 55-70 | 0:05 |
| 4 | 1.2 | 415 | 405-425 | 65 | 55-70 | 1:00 |
| 5 | 0 | 0 | — | 37 | 27-42 | 0:05 |

As discussed in the present disclosure, a voltage is initially applied to achieve a target current. The voltage is then adjusted to maintain the target current until a target voltage is reached, and then the target voltage is maintained until a desired current behavior is achieved as a function of time.

Following the first aging process, the electrolytic capacitor was impregnated with a second electrolyte. The second electrolyte had the same chemical composition as the first electrolyte. The electrolytic capacitor was aged using the final aging process summarized in Table 2 below.

TABLE 2

| Step | Current (mA) | Voltage (V) | Voltage Tolerance (V) | Temperature (° C.) | Temperature Tolerance (° C.) | Time (Hr:Min) |
|---|---|---|---|---|---|---|
| 1 | 0 | 0 | | 85 | 75-90 | 0:15 |
| 2 | 1 | 400 | | 85 | 75-90 | 0:25 |
| 3 | 0 | 0 | | 85 | 75-90 | 0:05 |
| 4 | 1 | 400 | | 85 | 75-90 | 0:25 |
| 5 | 0 | 0 | | 85 | 75-90 | 0:05 |
| 6 | 1 | 400 | | 85 | 75-90 | 0:25 |
| 7 | 0 | 0 | | 85 | 75-90 | 0:05 |
| 8 | 1 | 400 | | 85 | 75-90 | 0:25 |
| 9 | 0 | 0 | | 85 | 75-90 | 0:05 |
| 10 | 1 | 400 | | 85 | 75-90 | 0:25 |
| 11 | 0 | 0 | | 85 | 75-90 | 0:05 |
| 12 | 1 | 400 | | 85 | 75-90 | 0:25 |
| 13 | 0 | 0 | | 85 | 75-90 | 0:05 |
| 14 | 1 | 400 | | 85 | 75-90 | 0:25 |
| 15 | 0 | 0 | | 85 | 75-90 | 0:05 |
| 16 | 1 | 400 | | 85 | 75-90 | 0:25 |
| 17 | 0 | 0 | | 85 | 75-90 | 0:05 |
| 18 | 1 | 400 | | 85 | 75-90 | 0:25 |
| 19 | 0 | 0 | | 85 | 75-90 | 0:05 |
| 20 | 1 | 400 | | 85 | 75-90 | 0:25 |
| 21 | 0 | 0 | | 37 | 27-42 | 1:00 |
| 22 | 1.2 | 430 | | 37 | 27-42 | 1:00 |
| 23 | 1.2 | 430 | | 37 | 27-42 | 1:00 |
| 24 | 0 | 0 | | 37 | 27-42 | 0:05 |

Following the final aging process, the electrolytic capacitor was impregnated with a third electrolyte. The third electrolyte has the same chemical composition as the first and second electrolytes.

Comparative Example 1

In Comparative Example 1, an electrolytic capacitor was aged according to a one-part aging process followed by impregnation with a final electrolyte. The aging process of Example 1 was performed using the first electrolyte, except as a one step process where the second electrolyte was not added.

Following the one-step aging process, the electrolytic capacitor was impregnated with the third electrolyte used in Example 1.

Figure 3:
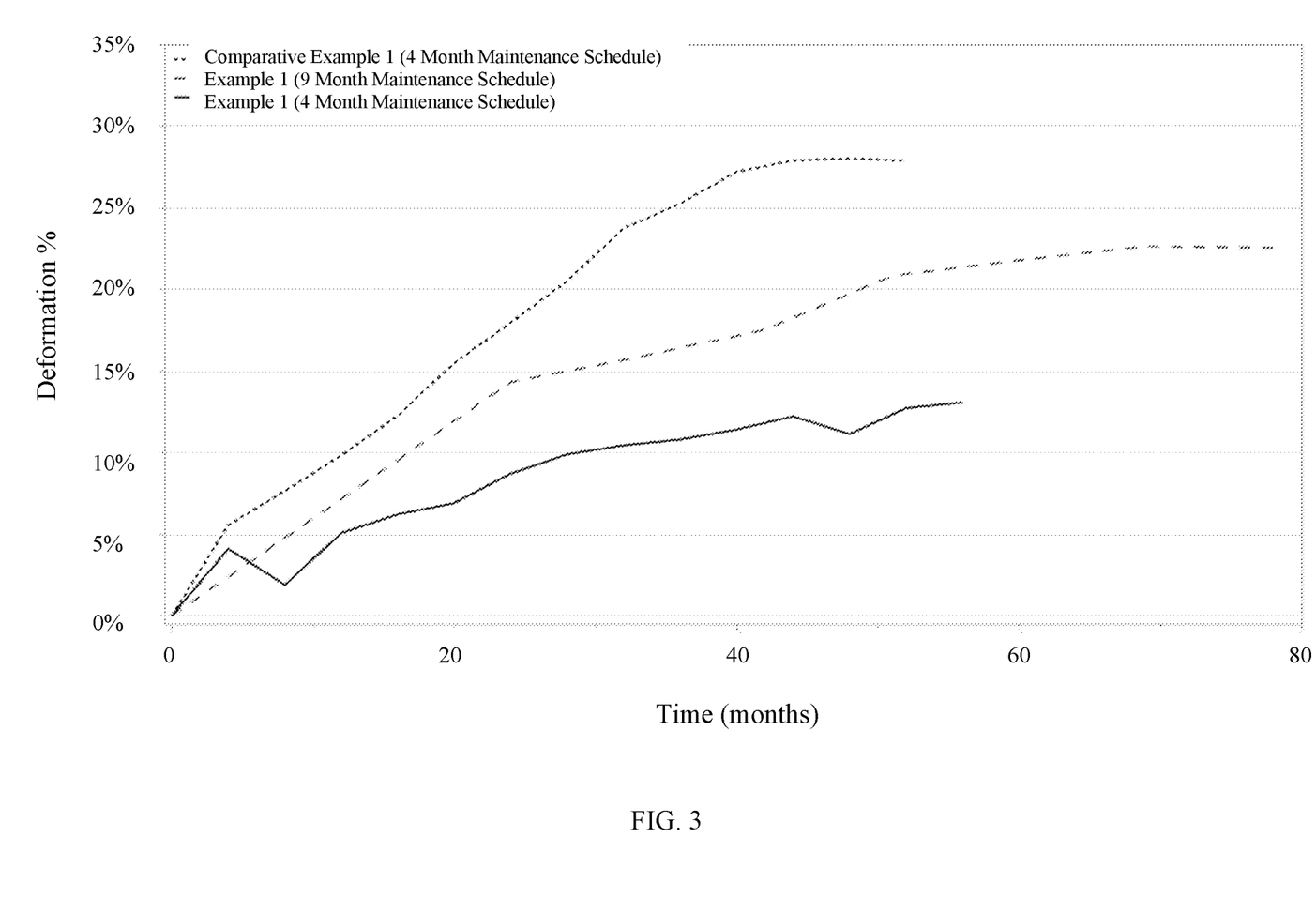
FIG. 3 depicts the performance of electrolytic capacitors prepared in accordance with embodiments of the present disclosure.

FIG. 3 depicts the charging times for the electrolytic capacitors of Example 1 and Comparative Example 1 over a period of time. FIG. 3 depicts an average of several capacitors of Example 1 and/or Comparative Example 1 measured at each interval of time. The electrolytic capacitors of Example 1 were evaluated using two different maintenance schemes. The first scheme (4 month scheduled in FIG. 3) applied capacitor maintenance at 4 month intervals. Between capacitor maintenance intervals, the capacitors were stored at 37° C. The second scheme (shown in FIG. 3) stored the capacitors for 24 months at 37° C., and then applied capacitor maintenance at 9-month intervals. The electrolytic capacitors of Comparative Example 1 (shown in FIG. 3) were also evaluated using the first maintenance scheme. The capacitor maintenance performed at each interval for the first and second schemes was the same. As shown in FIG. 3 for the 4 month maintenance scheme, the deformation decreases by about 50% to 60% on average at a given time interval for the electrolytic capacitors of Example 1, which uses the aging method of the present disclosure, in comparison to Comparative Example 1. Further, the capacitors of Example 1 using the 9-month scheme also outperform the capacitors of Comparative Example 1 using the 4-month maintenance scheme. These results indicate that the methods of the present disclosure can reduce the need for capacitor maintenance, which can beneficially result in a longer battery lifetime in an ICD.

Example 2

In Example 2, electrolytes were modified with the intent of lowering water concentration, but maintaining conductivity. Three types of electrolytes were used having the properties shown in Table 3 below.

TABLE 3

| | pH | Conductivity (mS/cm) | Temperature (° C.) | Moisture (%) | Phosphate (ppm) |
|---|---|---|---|---|---|
| Control Electrolyte | 6.96 | 2.91 | 30 | 1.53 | 176 |
| Electrolyte 1 | 7.2 | 2.78 | 30 | 0.51 | 166 |
| Electrolyte 2 | 7.25 | 3.07 | 30 | 0.86 | 189 |

The Control Electrolyte, Electrolyte 1 and Electrolyte 2 use the same components as the electrolyte of Example 1 with the exceptions noted in Table 3 above. The moisture content is determined by a Karl Fischer titration method known to those of skill in the art.

The Control Electrolyte, Electrolyte 1, and Electrolyte 2 were applied to capacitors as part of a two-step aging process, similar to Example 1, using the impregnation schemes (as shown in Table 4 below) for a Control Group and Groups 1 to 4.

TABLE 4

| | First Impregnation | Second Impregnation | Third Impregnation |
|---|---|---|---|
| Control | Control Electrolyte | Control Electrolyte | Control Electrolyte |
| Group 1 | Control Electrolyte | Electrolyte 1 | Electrolyte 1 |
| Group 2 | Electrolyte 1 | Electrolyte 1 | Electrolyte 1 |
| Group 3 | Electrolyte 2 | Electrolyte 1 | Electrolyte 1 |
| Group 4 | Electrolyte 2 | Electrolyte 2 | Electrolyte 2 |

There were limited differences between the various groups with the exception that leakage increased as water concentration was reduced in the first impregnation cycle. There were more scintillation rejects for Groups 2 to 4, possibly due to lower water content.

Figure 4:
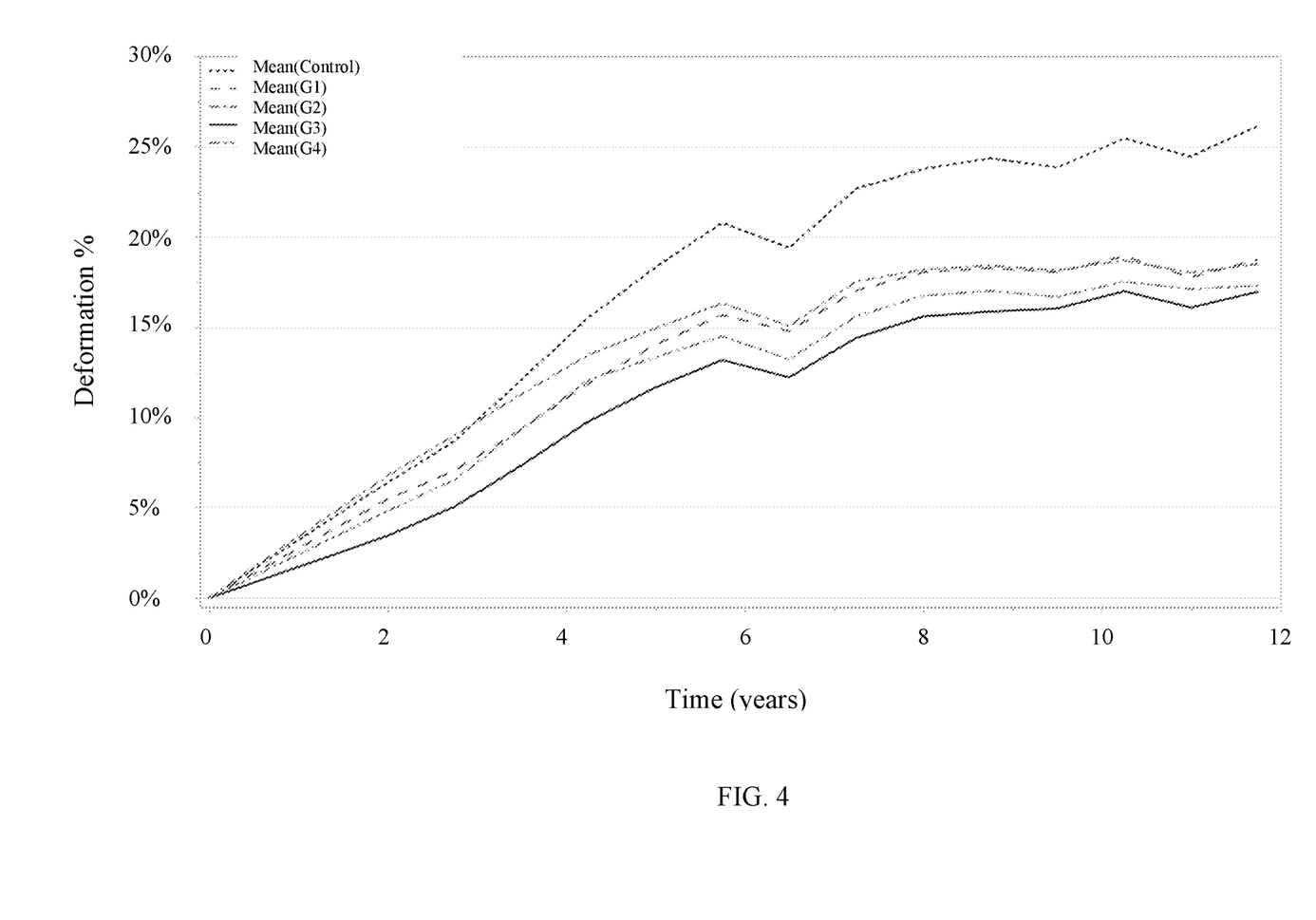
FIG. 4 depicts the performance of electrolytic capacitors prepared in accordance with embodiments of the present disclosure.

FIG. 4 depicts an amount of deformation for the electrolytic capacitors of the Control Group and Groups 1 to 4 over a period of time. A maintenance scheme was applied at 1 month intervals. Between capacitor maintenance intervals, the capacitors were stored at 37° C. The capacitor maintenance performed at each interval was the same. The electrolytic capacitors of Groups 1 to 4 demonstrate about a 25% reduction in deformation compared to that of the Control Group.

To summarize, the present disclosure describes a method of manufacturing an aluminum electrolytic capacitor, the method comprising impregnating an aluminum electrolytic capacitor with a first electrolyte to form a first impregnated capacitor, aging the first impregnated capacitor using a first aging process to form a first aged capacitor, impregnating the first aged capacitor with a second electrolyte to form a second impregnated capacitor, the second electrolyte being different from the first electrolyte, aging the second impregnated capacitor using a final aging process to form a final aged capacitor, and impregnating the final aged capacitor with a third electrolyte; and/or the first aging process may include an aging step comprising maintaining a target current between an anode and a cathode of the first impregnated capacitor until a target voltage is reached to form an oxide layer on an edge surface of the anode, and maintaining the target voltage for a period of time or until a desired current behavior is achieved as a function of time, wherein the first impregnated capacitor is maintained at a temperature while the target voltage is maintained; and/or the first impregnated capacitor may be maintained at a temperature ranging from about 75° C. to about 90° C. during the aging step; and/or the target voltage of the aging step may range from about 400 Volts to about 440 Volts; and/or the first aging process may include a discharge step comprising discharging the first impregnated capacitor from the target voltage to zero voltage; and/or the first aging process may further comprise a plurality of the aging steps, and a plurality of the discharge steps; and/or each of the discharge steps may be alternated with one of the aging steps; and/or a duration of a discharging step in the plurality of discharge steps may be about 5 minutes or less; and/or a summed duration of the total aging steps in the plurality of aging steps may range from about 1 hour to about 10 hours; and/or the first, second, and third electrolytes may have the same composition, and may comprise an electrolyte solvent, an electrolytic salt, and water, wherein the water is present in an amount of up to about 3 weight percent (wt %) based on the total weight of the electrolyte; and/or the water may be present in an amount of less than about 1 weight percent (wt %); and/or the first electrolyte may comprise an electrolyte solvent, an electrolytic salt, and water, and the water may be present in an amount of up to about 3 weight percent (wt %) based on the total weight of the first electrolyte; and/or the second and third electrolytes may have the same composition, and may comprise an electrolyte solvent, an electrolytic salt, and water, wherein the water is present in an amount of less than about 1 weight percent (wt %) based on the total weight of the electrolyte; and/or in the first electrolyte, the water may be present in an amount of great than about 1 wt % to about 2 wt % based on the total weight of the first electrolyte; and/or in the first electrolyte, the water may be present in an amount of less than about 1 wt % based on the total weight of the first electrolyte, and the water content in the second and third electrolytes may be less than the water content of the first electrolyte; and/or the final aging process may include an aging step comprising maintaining a target current between an anode and a cathode of the second impregnated capacitor until a target voltage is reached, and maintaining the target voltage for a period of time or until a desired current behavior is achieved as a function of time, wherein, during the aging step, the second impregnated capacitor is maintained at a temperature; and/or the second impregnated capacitor may be maintained at a temperature ranging from about 75° C. to about 90° C. during the aging step; and/or the target voltage of the aging step may range from about 400 Volts to about 440 Volts; and/or the final aging process may include a discharge step comprising discharging the second impregnated capacitor from the first target voltage to zero voltage; and/or the final aging process may further include a plurality of the discharge steps, and a plurality of the aging steps, wherein each of the discharge steps is alternated with one of the aging steps.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A method of manufacturing an aluminum electrolytic capacitor, the method comprising:
   impregnating an aluminum electrolytic capacitor with a first electrolyte to form a first impregnated capacitor;
   aging the first impregnated capacitor using a first aging process to form a first aged capacitor;
   impregnating the first aged capacitor with a second electrolyte to form a second impregnated capacitor;

aging the second impregnated capacitor using a final aging process to form a final aged capacitor; and impregnating the final aged capacitor with a third electrolyte.

2. The method of claim 1, wherein the first aging process includes an aging step comprising:

maintaining a target current between an anode and a cathode of the first impregnated capacitor until a target voltage is reached to form an oxide layer on an edge surface of the anode; and maintaining the target voltage for a period of time or until a desired current behavior is achieved as a function of time, wherein the first impregnated capacitor is maintained at a temperature while the target voltage is maintained.

3. The method of claim 2, wherein the first impregnated capacitor is maintained at a temperature ranging from about 75° C. to about 90° C. during the aging step.

4. The method of claim 2, wherein the target voltage of the aging step ranges from about 400 Volts to about 440 Volts.

5. The method of claim 2, wherein the first aging process includes a discharge step comprising:

discharging the first impregnated capacitor from the target voltage to zero voltage.

6. The method of claim 5, wherein the first aging process further comprises:

a plurality of the aging steps; and a plurality of the discharge steps.

7. The method of claim 6, wherein each of the discharge steps is alternated with one of the aging steps.

8. The method of claim 7, wherein a duration of a discharging step in the plurality of discharge steps is about 5 minutes or less.

9. The method of claim 7, wherein a summed duration of the total aging steps in the plurality of aging steps ranges from about 1 hour to about 10 hours.

10. The method of claim 1, wherein the first, second, and third electrolytes have the same composition, and comprise:

an electrolyte solvent;

an electrolytic salt; and water, wherein the water is present in an amount of up to about 3 weight percent (wt %) based on the total weight of the electrolyte.

11. The method of claim 10, wherein the water is present in an amount of less than about 1 wt %.

12. The method of claim 1, where the first electrolyte comprises:

an electrolyte solvent;

an electrolytic salt; and water, wherein the water is present in an amount of up to about 3 weight percent (wt %) based on the total weight of the first electrolyte.

13. The method of claim 12, wherein the second and third electrolytes have the same composition, and comprise:

an electrolyte solvent;

an electrolytic salt; and water, wherein the water is present in an amount of less than about 1 weight percent (wt %) based on the total weight of the electrolyte.

14. The method of claim 13, wherein, in the first electrolyte, the water is present in an amount of greater than about 1 wt % to about 2 wt % based on the total weight of the first electrolyte.

15. The method of claim 14, wherein the final aging process further includes:

a plurality of the discharge steps; and a plurality of the aging steps, wherein each of the discharge steps is alternated with one of the aging steps.

16. The method of claim 13, wherein, in the first electrolyte, the water is present in an amount of less than about 1 wt % based on the total weight of the first electrolyte, and wherein the water content in the second and third electrolytes is less than the water content of the first electrolyte.

17. The method of claim 1, wherein the final aging process includes an aging step comprising:

maintaining a target current between an anode and a cathode of the second impregnated capacitor until a target voltage is reached; and maintaining the target voltage for a period of time or until a desired current behavior is achieved as a function of time, wherein, during the aging step, the second impregnated capacitor is maintained at a temperature.

18. The method of claim 17, wherein the second impregnated capacitor is maintained at a temperature ranging from about 75° C. to about 90° C. during the aging step.

19. The method of claim 17, wherein the target voltage of the aging step ranges from about 400 Volts to about 440 Volts.

20. The method of claim 17, wherein the final aging process includes a discharge step comprising:

discharging the second impregnated capacitor from the first target voltage to zero voltage.

* * * * *